US012166297B1

(12) United States Patent
Tianang et al.

(10) Patent No.: US 12,166,297 B1
(45) Date of Patent: Dec. 10, 2024

(54) WIDE ANGLE PHASED ARRAY FED REFLECTOR FOR RADIO FREQUENCY ANTENNAS

(71) Applicant: Lockheed Martin Corporation, Bethesda, MD (US)

(72) Inventors: Elie Germain Tianang, Aurora, CO (US); Thomas Henry Hand, Highlands Ranch, CO (US); Carlos James Romero, Littleton, CO (US); Daniel Lloyd Reigh, II, Highlands Ranch, CO (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 151 days.

(21) Appl. No.: 18/152,926

(22) Filed: Jan. 11, 2023

Related U.S. Application Data

(60) Provisional application No. 63/298,921, filed on Jan. 12, 2022.

(51) Int. Cl.
*H01Q 9/28* (2006.01)
*H01Q 19/10* (2006.01)

(52) U.S. Cl.
CPC ............. *H01Q 9/28* (2013.01); *H01Q 19/102* (2013.01)

(58) Field of Classification Search
CPC ............................... H01Q 9/28; H01Q 19/102
See application file for complete search history.

(56) References Cited

U.S. PATENT DOCUMENTS

| | | | | |
|---|---|---|---|---|
| 6,844,862 | B1 | 1/2005 | Cencich et al. | |
| 11,264,729 | B2 | 3/2022 | Hand et al. | |
| 11,688,950 | B2 | 6/2023 | Bhattacharyya et al. | |
| 2019/0109384 | A1* | 4/2019 | Rankin | H01Q 15/14 |
| 2021/0288415 | A1 | 9/2021 | Bennett et al. | |

OTHER PUBLICATIONS

Zhu, Daohong et al., "MM-Wave Cylindrical Dielectric Lens Antenna For Full Azimuth Scanning Coverage," 2011 China-Japan Joint Microwave Conference, 4 pages, Apr. 20-22, 2011.

Cooley, Michael, "Phased Array-Fed Reflector (PAFR) Antenna Architectures For Space-Based Sensors," IEEE, 11 pages, 2015.

Erukhimovich, A. et al., Abstract for "Development Of Double-Reflector Antennas With A Displaced Focal Axis," Radiotekhnika, vol. 30, pp. 54-59, Sep. 1975.

Fenn, Alan J. et al., "Design And Analysis Of An Axisymmetric Phased Array Fed Gregorian Reflector System For Limited Scanning," 4 pages, Jan. 22, 2016.

(Continued)

*Primary Examiner* — Hoang V Nguyen

(57) ABSTRACT

Provided herein are various enhancements for radio frequency antennas and antenna arrangements. In one example, an apparatus comprises a reflector for radio frequency energy having a reflector surface comprising a paraboloid of revolution that establishes an inverted truncated conical shape with a concave nappe. The reflector surface is configured to interact with the radio frequency energy to direct at least a portion of the radio frequency energy towards a feed array mounted about a perimeter of the inverted truncated conical shape.

20 Claims, 6 Drawing Sheets

(56) References Cited

OTHER PUBLICATIONS

Moreira, Fernando J. S., "Design And Rigorous Analysis Of Generalized Axially-Symmetric Dual-Reflector Antennas," Ph.D. Dissertation, 288 pages, Aug. 1997.

Moreira, Fernando J. S. et al., "Generalized Classical Axially Symmetric Dual-Reflector Antennas," IEEE Transactions on Antennas and Propagation, vol. 49, No. 4, pp. 547-554, Apr. 2001.

Prata, Jr., Aluizio et al., "Displaced-Axis-Ellipse Reflector Antenna For Spacecraft Communications," IEEE, pp. 391-395, 2003.

Radartutorial, "ARSR-4," https://www.radartutorial.eu/19.kartei/03.atc/karte028.en.html, 1 page, Nov. 10, 2021.

Wikipedia, "Pave Paws," https://web.archive.org/web/20221130211402/https://en.wikipedia.org/wiki/PAVE_PAWS, 10 pages, Sep. 10, 2022.

* cited by examiner

WIDE ANGLE PHASED ARRAY FED REFLECTOR FOR RADIO FREQUENCY ANTENNAS

RELATED APPLICATIONS

This application hereby claims the benefit of and priority to U.S. Provisional Patent Application No. 63/298,921, titled "WIDE SCAN PHASED ARRAY FED REFLECTOR SYSTEMS," filed Jan. 12, 2022, which is hereby incorporated by reference in its entirety.

TECHNICAL BACKGROUND

Microwave radio frequency (RF) antenna designs can be formed from a grid of many individually controlled RF antenna elements, often called an Electronically Steerable Array (ESA). ESAs can include Direct Radiating Arrays (DRAs) as well as phased array fed reflector-based architectures, referred to as Phased Array Fed Reflectors (PAFRs). DRAs can provide wide scan swath and wide frequency bandwidth performance for properly selected RF feed element types and feed array element grid spacings. However, one difficulty associated with DRA architectures is that, for a large gain and wide scan requirement, the radiating aperture requires numerous feed elements, and a correspondingly large aperture size. This can place a substantial increase in the power required to operate the array, as well as increase in the overall weight, size envelope, and cost.

Phased Array Fed Reflectors (PAFRs) include a generally smaller array of feed elements coupled with a corresponding reflector element, which can provide higher gain compared to a DRA, for a more limited scan swath while using a stationary reflector. One example PAFR architecture produces a single focal point that limits the achievable scan volume to only a few beamwidths off boresight by using changes in amplitude and phase weights of the feed array. Unfortunately, defocusing the center of the feed array phase from the single focal point when conducting these scanning operations leads to large scan losses for most scan angles. Thus, PAFRs typically include gimbals for greater spatial coverage and scanning, which also increases overall weight, size envelope, and cost, as well as limits the amount of time required to scan a large field of regard.

Overview

Provided herein are various enhancements for RF antennas and antenna arrangements, such as in Phased Array Fed Reflector (PAFR) architectures. Although not limited to paraboloids or parabolic shapes, the examples herein provide an RF reflector architecture using an upper branch parabola forming a paraboloid of revolution, which is mounted having an inverted conical configuration with respect to a base. RF feed elements and associated arrays are arranged at or near the base about a perimeter of the reflector. This configuration provides a wide elevation scan volume (≥45 deg swath) without the use of mechanical rotation, gimbals, or other similar dynamic elements, leading to a robust, static installation. Also, a much smaller active aperture is required to meet a given gain requirement compared to a DRA equivalent. Thus, the examples herein thus describe wide angle phased array fed reflectors for near constant directivity scanning.

In one example implementation, an apparatus comprises a reflector for radio frequency energy having a reflector surface comprising a paraboloid of revolution that establishes an inverted truncated conical shape with a concave nappe. The reflector surface is configured to interact with the incident external radio frequency energy to direct at least a portion of the radio frequency energy towards a feed array mounted about a perimeter of the inverted truncated conical shape.

In another example implementation, an antenna system comprises a reflector for radio frequency energy having a reflector surface comprising a paraboloid of revolution that establishes an inverted truncated conical shape with a concave nappe, wherein the inverted truncated conical shape comprises a convex side having the concave nappe and a concave side comprising an interior cavity. A first feed array is mounted about a perimeter the inverted truncated conical shape. A second feed array is positioned in or above the interior cavity on the concave side. A structure is configured to mount to a base of the reflector and hold at least the first feed array.

In yet another example implementation, a method of manufacturing an antenna element is provided. The method includes forming a reflector for radio frequency energy having a reflector surface comprising a paraboloid of revolution that establishes an inverted truncated conical shape with a concave nappe.

This Overview is provided to introduce a selection of concepts in a simplified form that are further described below in the Detailed Description. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

DETAILED DESCRIPTION

Figure 1:
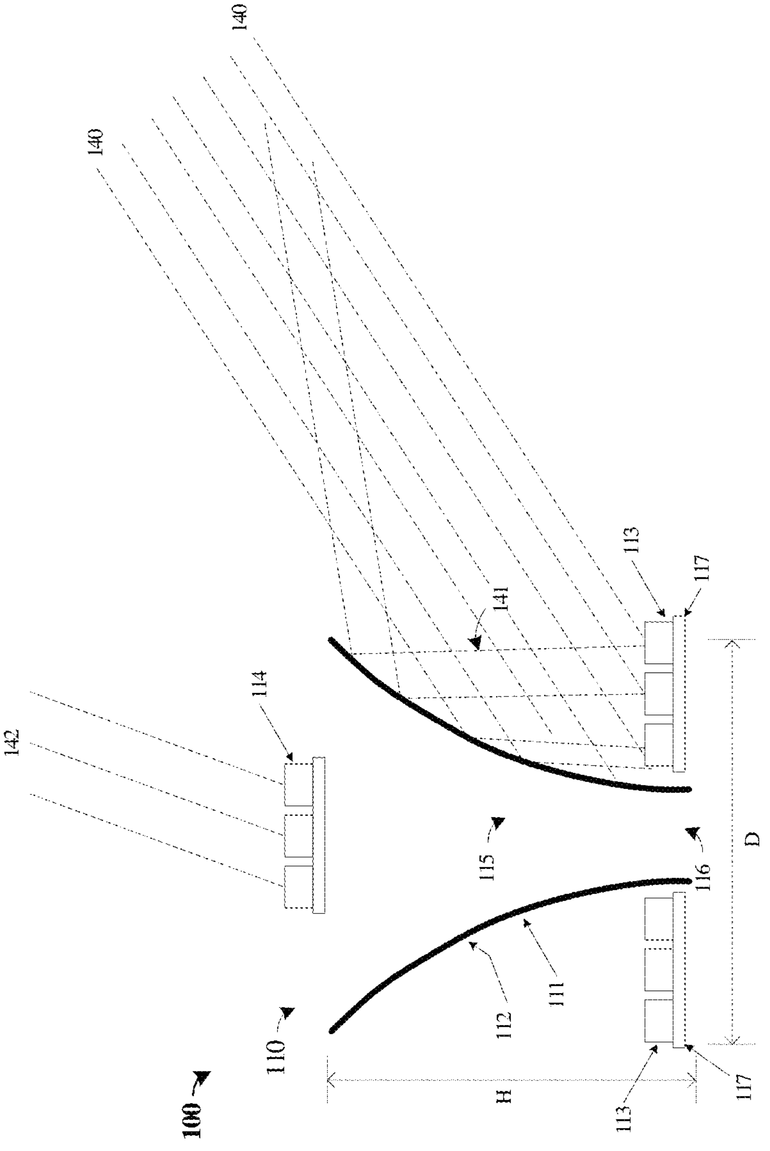
FIG. 1 illustrates an example antenna configuration in an implementation.

Various types of microwave radio frequency (RF) antenna arrangements can be formed from a grid or repeating arrangement of many individually controlled RF antenna elements. Examples of these antennas include phased arrays and electronically steerable arrays (ESAs). Antenna systems that employ ESAs can include Direct Radiating Arrays (DRAs) that directly (without a reflector element) emit or receive energy with a grid of RF antenna elements, and reflector-enabled architectures which include Phased Array Fed Reflectors (PAFRs). DRAs can be designed as having 'narrow' or 'wide' field of view (FOV) configurations, while PAFRs are traditionally limited to a 'narrow' FOV. Wide FOV antenna configurations are desirable for many applications. Example applications include radar, airborne communications at low altitudes that need link closure across horizon and nadir angles, maritime antennas in "list" conditions attempting to maintain link closure with an airborne or satellite terminal, and ground, airborne, and space-based ESAs that require large scan volumes, particularly at low orbital altitudes. However, to achieve a wide FOV, large arrays or multi-faceted arrays are traditionally employed for DRAs, and PAFRs often require gimbals which rotate or turn the array/reflector assembly to scan over a wider field of view. The examples herein can provide for wide FOV applications without the need for gimbaling or massive DRAs. When conventional DRAs and PAFRs are employed in these various wide FOV applications, the antenna systems are typically over-designed (over-sized aperture), or require additional equipment to meet performance requirements at the most extreme geometries.

Provided herein are various enhancements for RF antennas and antenna arrangements, such as in Phased Array Fed Reflector (PAFR) architectures. Wide angle ESA Fed Reflector (WAEFR) architectures can use a divergent reflector comprising a lower branch parabola forming a paraboloid of revolution. However, while providing a wide field of view, some WAEFR architectures, can suffer from low aperture efficiency due to diffraction effects from the reflector. Additionally, this configuration requires support struts for the feed array, which introduces blockage and reduces the overall efficiency of the antenna. For example, when using a divergent reflector, a plane wave incident on the reflector tends to scatter in a specular manner off the reflector surface, resulting only a small "wedge" on the reflector contributing to the total pattern formation. This results in a diminished total aperture efficiency, typically in the 5-10% range. The examples herein provide an enhanced WAEFR reflector architecture using an upper branch parabola forming a paraboloid of revolution, which is mounted in an inverted configuration with respect to a base. It should be noted that a parabolic profile is just one example of an equation-based shape or cross-section for a reflector surface. The profile of the reflector surfaces discussed herein can be any suitable shape or cross-section selected to achieve a target gain or other target parameters for desired applications, and these profiles might be defined by a corresponding equation or rotation operation.

The architectures or configurations discussed herein provide for a smaller reflector size to meet a given gain requirement compared to the lower branch parabola architecture mentioned above, as well as employing a smaller feed array (ESA), resulting in lower power consumption and lower cost implementation. Furthermore, the mounting of this upper branch parabola reflector can eliminate struts or other blockages of the reflector due to the corresponding mounting configuration. This leads to a higher aperture efficiency, such as over 10% using some measurement techniques, which can be even higher when using a lens element. Also, a wider (≥45 deg swath) elevation scan volume can be achieved over an entire 360-degree azimuth area without the use of mechanical rotation, gimbals, or other similar elements, leading to a robust, higher reliability installation. Ease of repair or replacement of ESA feed elements is also achieved using the inverted reflector design which has feed elements mounted at or near a base about a perimeter of the reflector. While the actual frequency ranges and power levels can vary based on geometry and application, one example includes frequencies spanning 0.02-55 GHz. When incorporating a lens element, power and cost reduction can be achieved for various frequency bands, such as for reducing a high-band ESA feed (e.g., 18-55 GHz) power consumption from 1,600 Watts (W) to <500 W. Moreover, these architectures can be employed across other various applications, such as 5G cellular communications.

Turning now to a first example implementation, FIG. 1 is presented. View 100 illustrates a cross-sectional side view of antenna arrangement 110 having a divergent style primary reflector. Arrangement 110 includes reflector 111 and feed arrays 113-114. Reflector 111 has reflector surface 112 with a diameter (D) and height (H) which can vary based on application and frequency range. In this example, reflector surface 112 comprises a tilted paraboloid of revolution having a divergent configuration for reflected RF energy. This tilted paraboloid of revolution can be defined by a paraboloid of revolution from an 'upper branch' of a parabola, which appears approximately as an inverted conic shape mounted to base 117. A further discussion of example shapes of reflector 111 and reflector surface 112 are included below.

Reflector 111 can have a ring focus configuration, with feed array 113 placed within a focal ring of ring focus reflector 111. This is in contrast to a point-focus antenna configuration, such as in reflectors that converge incident RF energy into a focal point (e.g. parabolic dish antennas). Feed array 113 can be placed in a concentric ring arrangement at or near the focal ring plane of reflector 111. This can widen the scan of reflector systems by using a ring-based reflector focus, and allow incident RF energy to be spread over the feed array. Due to the reflector arrangement in ring-focus PAFR systems, an incident plane wave tends to scatter in a divergent manner, sometimes referred to as the "sprinkler" effect since the RF energy 'rays' trace an expanding divergent shape similar to that of a lawn sprinkler. Less RF energy is then incident on the feed array, lowering the overall aperture efficiency. Thus, a ring-focus PAFR architecture, while providing a wider field of view than a conventional point-focus PAFR, typically has a corresponding lower aperture efficiency than the WAFER described herein (e.g., 5-10% in some cases) due to divergent effects of the main reflector. However, the enhanced configuration of reflector 111 increases this aperture efficiency to 10% in some cases, or greater.

Example RF rays 140 are shown as a portion of a plane wave impinging onto reflector 111. When RF energy (represented by a plane wave) is incident onto and interacts with reflector 111, a divergent or scattered pattern 141 results from specular reflection off reflector surface 112, leading to a decreased density of RF energy onto feed array 113. Also, this divergent pattern of RF energy creates a wedge, sweeping through an angle on reflector surface 112, contributing to a corresponding pattern of RF energy reflected onto a subset of feed array 113. Divergent rays, such as portions of RF rays 141, that "miss" feed array 113 can lower overall aperture efficiency. An incident plane wave induces a non-uniform amplitude taper on feed array 113.

Example RF rays 142 are shown as a portion of a plane wave impinging onto feed array 114, or alternatively, as a portion of a transmission emitted by feed array 114. In this example, feed array 114 is operated in a DRA configuration, and feed array 113 is operated in a PAFR configuration, although variations are possible. Feed array 114 can be referred to a zenith-facing array, and used for transmission of RF energy concurrent with receipt of RF energy by feed array 113 to provide near hemispherical coverage for the composite antenna system.

Turning now to a discussion of the elements of FIG. 1, reflector 111 comprises a paraboloid of revolution which forms reflector surface 112. Reflector 111 can be formed using any suitable manufacturing process with a high electrical conductivity material, such as machining, lathing, sheet metal forming, additive manufacturing, casting, molding, or other manufacturing processes, including combinations thereof. The manufacturing process can include forming a paraboloid of revolution having a configuration noted herein. The surface and material of reflector 111 typically comprises materials and surface properties providing specular reflection to RF signals over at least a target frequency range or desired bandwidth. Materials can be any suitable electric conductor material, such as metallic materials, metallic alloys, or composite structures having conductive surface layers or coatings. Example metallic materials can include aluminum, gold, copper, steel, nickel, titanium, or various combinations and alloys thereof. Other suitable materials can be employed than the various enumerated ones herein.

Reflector surface 112 comprises a generally conical shape with a concave nappe. In this example, the concave nappe comprises a concave parabolic nappe, although the examples herein are not limited to such shapes. The conical shape has a convex side and a concave side with gap 116 and reflector interior 115. In FIG. 1, the convex side comprises a 'bottom' forming gap 116, and the concave side comprises the 'top' or underside of reflector surface 112 forming reflector interior 115. The concave side can be omitted in some examples that have a material 'bulk' filling a volume to form reflector 111, with a convex surface of the material bulk forming reflector surface 112. The material bulk might be solid, hollow, or webbed for structural stability and weight reduction, among other configurations. An axially displaced configuration can instead be employed, or configurations not having a central gap or aperture formed in reflector surface 112. Central gap 116 is included for weight reduction, cabling apertures, structural supports, thermal regulation elements, or an aperture for passage of secondary- or tertiary-reflected RF signals, among other purposes. Reflector 111 or reflector surface 112 is not shown as tilted relative to the focal plane in FIG. 1 for beam coverage within a conical scan volume about the boresight. In other examples, reflector 111 or reflector surface 112 can be tilted a number of degrees from a nominal position for beam coverage to be centered about a desired scan volume.

Feed array 113 comprises an array of a selected quantity of RF feed elements in a concentric ring, perimeter grid, or other regular pattern, defined in part by modular grid-shaped 'unit cell' feed elements. Feed array 114 comprises a zenith-facing array of a separate set of RF feed elements. The RF feed elements can comprise various antennas or antenna types, such as horn antennas, aperture antennas, patch antennas, Vivaldi antennas, magnetoelectric dipole antennas, or other antenna elements suitable for packing into electronically steered arrays or other phased array styles and types. The RF feed element quantity, size, and antenna type/configuration can depend on the frequency range or bandwidth employed, the power requirements, desired beam directivity, gain targets, and various other operational targets for the antenna. Various structural support members, such as base 117, can be coupled to feed array 113 or feed array 114 to position feed elements a selected distance from reflector surface 112 or from any lens element, if included. A lens element can also be coupled to or supported by such support members. The RF feed elements of feed array 113 can be arranged parallel to the focal plane or arranged on an inclined angle relative to the focal plane of reflector 111. The RF feed elements of feed array 113 or feed array 114 can have a radial grid arrangement, a square grid arrangement, a rectangular grid arrangement, circular/elliptical grid arrangement, a hexagonal grid arrangement, an irregular grid arrangement, or a sparse grid arrangement, among other arrangements. Typically, feed array 114 is operated in a DRA configuration to cover the angular volume missed by the reflector system, and feed array 113 is operated in a PAFR configuration, although variations are possible.

Feed array 113-114 and the RF feed elements can have various coaxial cabling, connectors, waveguide structures, orthomode transducers (OMTs), couplers, polarizers, RF filters, structural supports, backplanes, circuit board elements, and other elements to transfer radiative RF signals to/from waveguides, conductive elements, or transmission line elements. Various control elements or electronics can be included, such as various RF circuitry, low-noise amplifiers, beamforming modules, phase shifters, time delay units, array control elements, attenuation control components, and the like. RF feed elements can employ right-hand and left-hand circularly polarized orthogonal signals which are converted to linearly polarized signals for handling by the feed circuitry, among other configurations.

Base 117 comprises various structural support members and is coupled to at least feed array 113 to position feed elements a selected distance from reflector surface 112. Base 117 can also comprise mounting elements to mount and hold reflector 111, such a clamps, fasteners, truss structures, welds, and other coupling elements. Base 117 might be configured to be mounted onto the ground or onto a structure, such as a building, tower, vehicle, craft, and the like. Base 117 can include various elements for establishing a desired angular orientation of reflector 111 and feed elements, such as leveling features, tilt motors, or alignment motors/servos. Base 117 can include further structural support elements to support feed elements 114 above a portion of reflector 111, such as struts or trusses.

Figure 2:
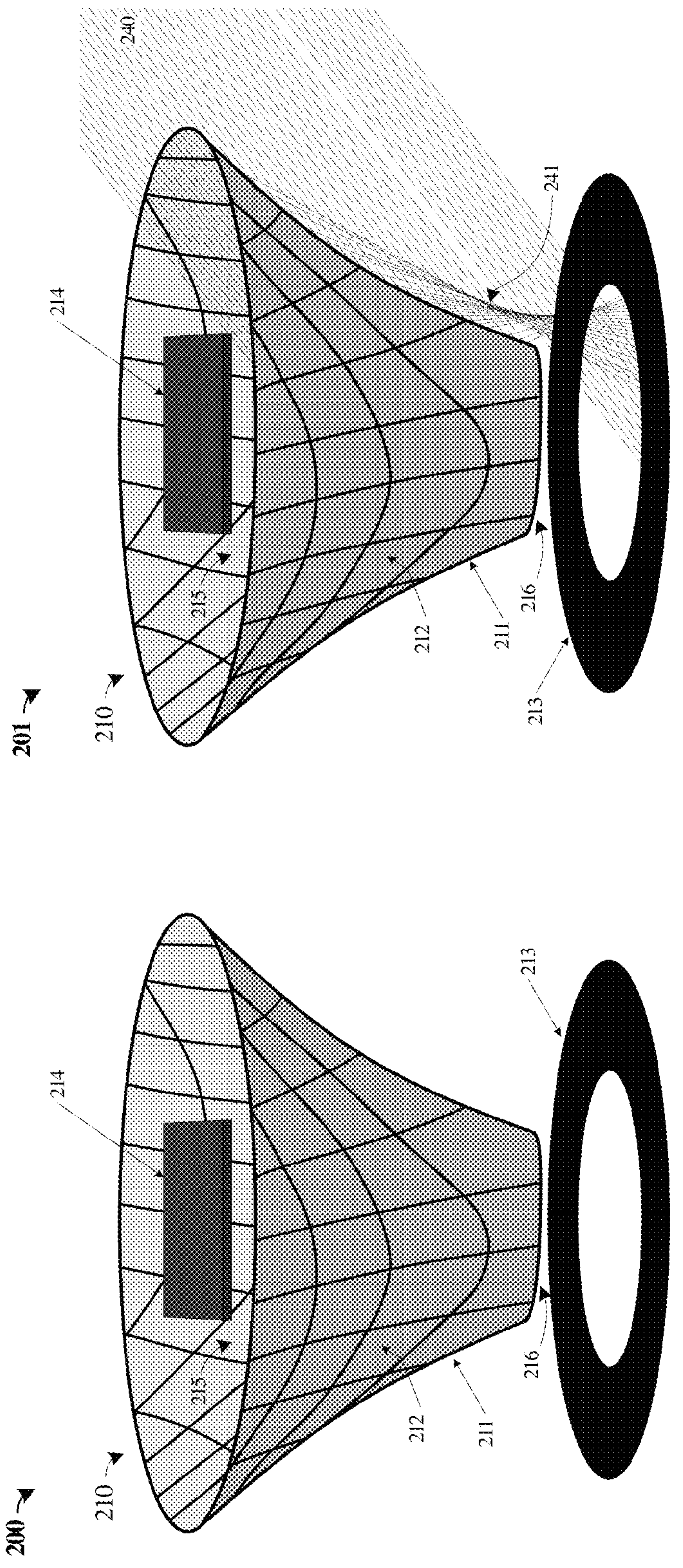
FIG. 2 illustrates example antenna configurations in an implementation.

FIG. 2 illustrates isometric views 200-201 of antenna arrangement 210. While similar elements of FIG. 1 can be included in FIG. 2, it should be understood that variations are possible. Antenna arrangement 210 includes reflector 211 having reflector surface 212 and also includes feed arrays 213-214. A more detailed view of incoming and reflected RF energy is illustrated in view 201. Although a base or other support structure can be included, such elements are omitted in FIG. 2 for clarity. In some examples, antenna arrangement 210 comprises a ground installation of an X-band ground terminal.

In view 200, reflector 211 comprises a generally conical shape with a concave parabolic nappe forming reflector surface 212. The conical shape has a convex side and a concave side with gap 216 and reflector interior cavity 215. In FIG. 2, the convex side comprises a 'bottom' forming gap 216, and the concave side comprises the 'top' or underside of reflector surface 212 forming reflector interior cavity 215. Feed array 213 is positioned a selected distance apart from reflector surface 212, typically at or near the focal ring established by reflector surface 212. Thus, feed array 213 forms a ring-shaped array about a perimeter of reflector 211. Feed array 214 is positioned above reflector 211, such as at or in reflector interior cavity 215 or an aperture in reflector 211 formed by reflector interior cavity 215. Feed array 214 can be positioned using struts, posts, truss elements, or other mounting hardware. Cabling or other conduits for feed array 214 can be fed through reflector interior cavity 215 and gap 216. Reflector interior cavity 215 might have additional reflection surfaces, such as a convex concentrating parabolic reflector mounted below feed array 214 for use by feed array 214. In some examples, feed array 213 is employed for Receive (Rx) of RF signals and feed array 214 is employed of Transmission (Tx) of RF signals. However, other examples include where both feed arrays are employed for both Tx/Rx operations.

In view 201, an incident RF energy wavefront 240 is shown impinging onto reflector surface 212, which is represented by example 'rays' as comprising a portion of an incoming plane wave. From here, the interaction with reflector surface 212 establishes ring-focused reflected RF energy 241, shown with many representative rays which impinge onto feed array 213. Feed array 213 can convert the received radiative RF energy into conducted signals provided to various receiver circuitry elements. Advantageously, the combination of feed array 213 and feed array 214 provides for wide coverage over various elevations and a 360-degree azimuth. Specifically, feed array 213 can comprise a WAEFR ESA feed for 0°-45° elevation swath (with <2 dB scan loss) and 0°-360° azimuth coverage, while feed array 214 can comprise a zenith ESA feed for 45°-90° elevation and 0°-360° azimuth coverage.

Figure 3:
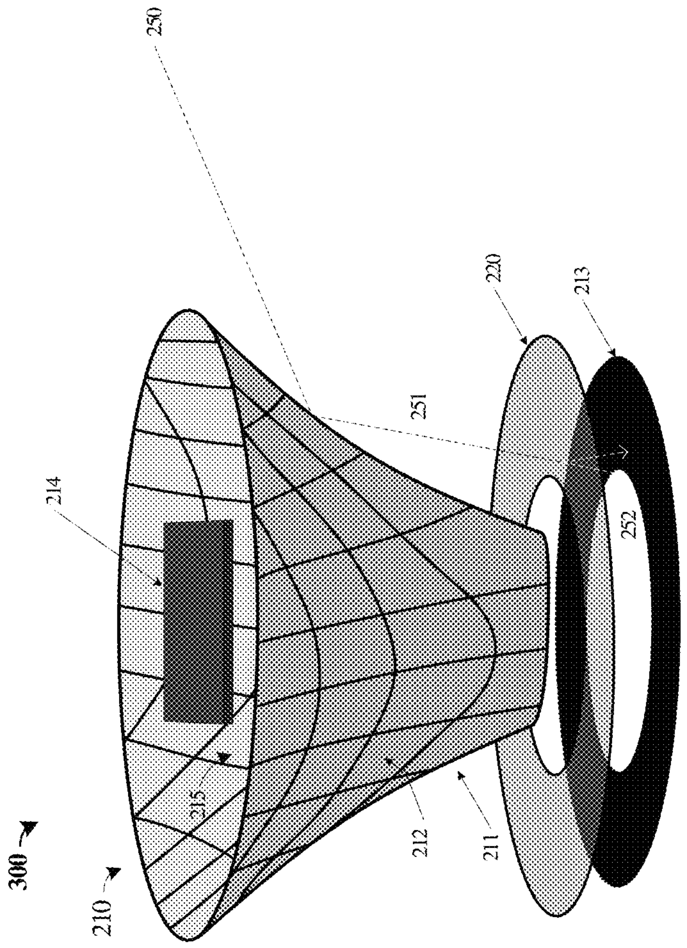
FIG. 3 illustrates an example antenna configuration in an implementation.

FIG. 3 illustrates isometric view 300 of antenna arrangement 210 with the addition of refractive lens element 220. While similar elements of FIGS. 1 and 2 can be included in FIG. 3, it should be understood that variations are possible.

As seen previously in view 201 of FIG. 2, incident RF energy 240 is shown impinging onto reflector surface 212, which is represented by example 'rays' as comprising a portion of an incoming plane wave. From here, the interaction with reflector surface 212 establishes ring-focused reflected RF energy 241, shown with many representative rays which impinge onto feed array 213. Similar RF energy is shown for incoming RF energy 250 and reflected RF energy 251. In certain configurations, reflected RF energy 251 can experience divergent or diffractive behavior from the geometry of reflector surface 212. This can be referred to as the "sprinkler" effect, which would normally reduce the amount of RF energy provided to feed array 213, and an overall lowering of aperture efficiency for antenna arrangement 210. However, lens element 220 is included which refracts a portion 252 of reflected RF energy 251 to provide a greater amount of RF energy 252 to feed array 213. Lens element 220 is positioned between reflector surface 212 and feed array 213 such that feed array 213 is placed at or near the focal length of lens element 220. Since lens element 220 establishes a generally converging effect on reflected RF energy 252, the RF energy is concentrated onto feed array 213 and over the interaction surface of feed array 213 facing reflector surface 212.

In divergent antenna configurations, lens element 220 converges a portion of the RF energy, normally subject to the "sprinkler" effect, backwards towards feed array 213, resulting in higher efficiency and without the use of lens element 220. In one example, the resultant peak of beam directivity can be improved by ~6 dB at 35 GHz corresponding to an aperture efficiency increase of 10-15% as compared to an omitted lens element for a similar reflector configuration. Also, this converged pattern of RF energy from lens element 220 creates a larger "wedge" onto feed array 213, contributing to a corresponding pattern of RF energy reflected onto an increased subset of feed array 213. Lens element 220 enables a larger portion of reflector surface 212 to be used in beam formation, resulting in a larger gain and more efficient beam, as well as increased sensitivity for receiver (Rx) systems and Effective Isotropic Radiated Power (EIRP) for transmitter (Tx) systems. For a given gain requirement, this can lead to a smaller reflector size, further reducing power requirements and cost.

As noted, lens element 220 alters the distribution of at least a portion of the incoming radio frequency energy. However, lens element 220 can have either a convergent focus or divergent focus with respect to feed array 213. In the convergent focus configuration, lens element 220 converges a portion of the RF energy over the detection area of feed array 213. This convergent focus configuration can capture a larger portion of the divergent RF energy that reaches lens element 220 from reflector surface 212, increasing the total aperture efficiency. In the divergent focus configuration, lens element 220 diverges or spreads a portion of the RF energy across a greater detection area of feed array 213. This divergent focus configuration can be employed to utilize a greater surface area of feed array 213 for increasing the quantity of feed elements employed for handing of RF energy. Tx divergent focus configurations can include similar configurations to employ a greater quantity of lens elements for transmissions, to perhaps operate each individual element at a lower power. To establish the divergent focus or convergent focus configurations, different physical shapes of lens elements can be employed, or different indices of refraction can be employed. Various combinations can be employed as well, were only a certain arc-length segments of the perimeter of the lens element have a divergent configuration, while further arc-length segments of the perimeter have a convergent configuration. This can be application dependent (i.e., end points or user terminals concentrated in certain radial directions) or dependent on the surroundings (i.e., foliage, buildings, blockages, obstructions in certain radial directions).

Lens element 220 comprises an RF-refracting material which allows passage of RF energy therethrough to reach feed array 213. Various configurations, thicknesses, diameters, radii of curvatures, and positioning of lens element 220 can be provided, and can depend on the application and may be empirically determined to provide a threshold level of aperture efficiency performance. The refraction properties of lens element 220 can be achieved using geometry of a uniform or homogenous refractive index material with a refractive index greater than 1, and incorporated into a biconvex shape or other shaped lens of appropriate refractive index and radius of curvature. One example refractive index is a Rexolite, which an index n=2.53. Other examples of refractive index materials include polymers, ceramics, or glass materials. The radii of curvature can be similar or different among the top/bottom radii for a biconvex lens. The refraction property of lens element 220 can instead be achieved using a graded index material or inhomogeneous material for which the edge geometry is less critical, which may comprise a generally uniform thickness or a generally rectilinear shape. A graded index material can include a generally flat cylinder having voids therein to achieve the desired refractive property. The refraction property of lens element 220 can be achieved using a frequency-selective surface (FSS), metalens, Fresnel lens, grating lens, or other lens configuration to enable wide angle scanning of an antenna as discussed herein. At times, weight or mass of lens element 220 might exceed threshold levels or requirements of a design, in these examples, multi-layer lenses formed from printed circuit board substrate material and polymer foam material can be employed.

Figure 4:
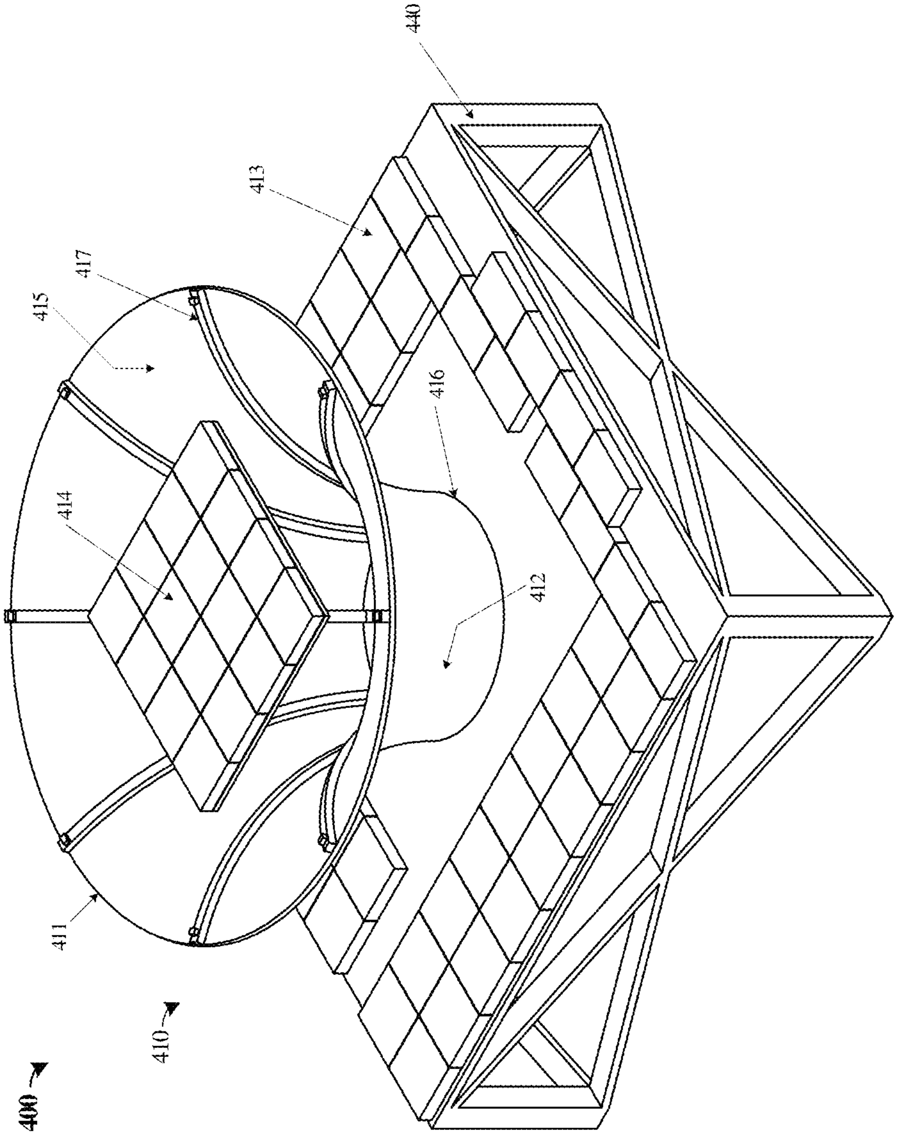
FIG. 4 illustrates an example antenna assembly in an implementation.

FIG. 4 illustrates isometric view 400 of antenna assembly 410. While similar elements of FIGS. 1-3 can be included in FIG. 4, it should be understood that variations are possible. Antenna assembly 410 includes reflector 411 having reflector surface 412 and also includes feed arrays 413-414. In some examples, antenna arrangement 210 comprises a ground installation of an X-band (e.g., 8-12 GHz) ground terminal having a ~5.4-meter diameter for reflector 411. Base 440 is included to structurally support reflector 411 and feed array 413 in a ground-based antenna system, and to axially align the reflector with respect to at least feed array 413. Various radome elements or covers can be employed over elements of antenna assembly 410 to protect from dust, humidity, debris, visual inspection, tampering, and various contaminants. Also, lens elements, such as seen in FIG. 3, can be included, but are omitted in FIG. 4 for clarity.

Reflector 411 comprises a generally conical shape with a concave parabolic nappe forming reflector surface 412. The conical shape has a convex side and a concave side with gap 416 and reflector interior cavity 415. In FIG. 4, the convex side comprises a 'bottom' forming an axially displacement as gap 416, and the concave side comprises the 'top' or underside of reflector surface 212 forming reflector interior cavity 415. Feed array 413 is positioned a selected distance apart from reflector surface 412, typically at or near the focal ring established by reflector surface 412. Thus, feed array 413 forms a grid arrangement about a perimeter of the base of reflector 411, approximately at gap 416 formed in reflector 411. Feed array 414 is positioned above reflector 411, such as at or in reflector interior cavity 415 or an aperture in reflector 411 formed by reflector interior cavity 415. Feed array 414 can be positioned using struts, posts, truss elements, or other mounting hardware, and can be coupled structurally to ribs 417. Reflector 411 incorporates longitudinal structural ribs 417 spaced apart on reflector interior cavity 415. Cabling or other conduits for feed array 414 can be fed through reflector interior cavity 415 and gap 416. Reflector interior cavity 415 might have additional reflection surfaces, such as a convex concentrating parabolic reflector mounted below feed array 414 for use by feed array 414.

In some examples, feed array 413 is employed for receiving (Rx) of RF signals and feed array 414 is employed of transmission (Tx) of RF signals. However, other examples include where both feed arrays are employed for both Tx/Rx operations. Incoming RF energy incident onto reflector surface 412 interacts with reflector surface 412 establishes ring-focused reflected RF energy which impinges onto feed array 213. Feed array 413 can convert the received radiative RF energy into conducted signals provided to various receiver circuitry elements. Advantageously, the combination of feed array 413 and feed array 414 provides for wide coverage over various elevations and a 360-degree azimuth. Specifically, feed array 413 can comprise a WAEFR ESA feed for a 0°-45° elevation swath (with <2 dB scan loss) and 0°-360° azimuth coverage, while feed array 414 can comprise a zenith ESA feed for 45°-90° elevation swath and 0°-360° azimuth coverage.

Figure 5:
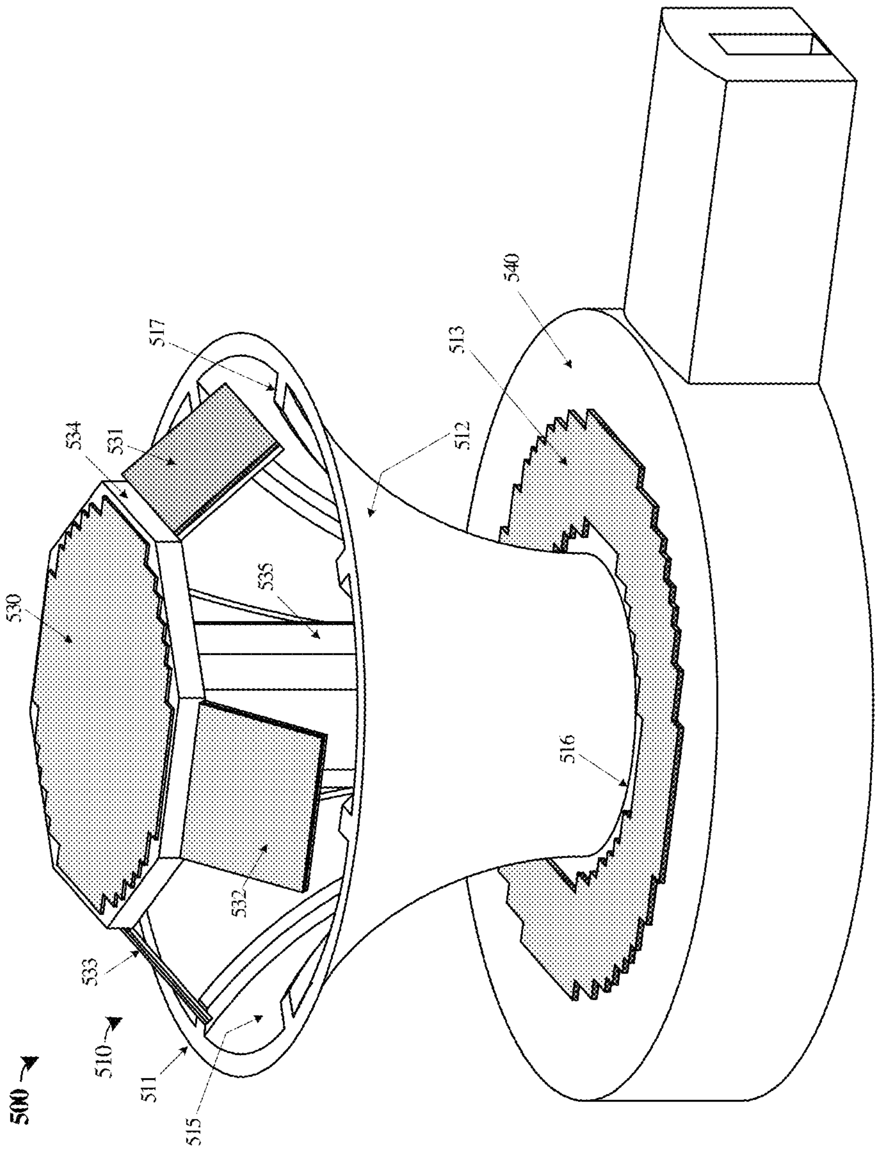
FIG. 5 illustrates an example antenna assembly in an implementation.

FIG. 5 illustrates isometric view 500 of antenna assembly 510. While similar elements of FIGS. 1-4 can be included in FIG. 5, it should be understood that variations are possible. Antenna assembly 510 includes reflector 511 having reflector surface 512 and also includes feed arrays 513 and 530-533. In some examples, antenna arrangement 510 comprises a ground installation of an S band feed (e.g., 2-4 GHz) or Ka band feed (26.5-40 GHz) ground terminal having a correspondingly sized diameter for reflector 511. Base 540 is included to structurally support reflector 511 and feed arrays in a ground-based antenna system, and to axially align the reflector with respect to the feed arrays. Various radome elements or covers can be employed over elements of antenna assembly 510 to protect from dust, humidity, debris, visual inspection, tampering, and various contaminants. Also, lens elements, such as seen in FIG. 3, can be included, but are omitted in FIG. 5 for clarity.

Reflector 511 comprises a generally conical shape with a concave parabolic nappe forming reflector surface 512. The conical shape has a convex side and a concave side with gap 516 and reflector interior cavity 515. In FIG. 5, the convex side comprises a 'bottom' forming gap 516, and the concave side comprises the 'top' or underside of reflector surface 512 forming reflector interior cavity 515. Feed array 513 is positioned a selected distance apart from reflector surface 512, typically at or near the focal ring established by reflector surface 512. Thus, feed array 513 forms a ring arrangement about a perimeter of the base of reflector 511, approximately at gap 516 formed in reflector 511. Reflector 511 incorporates longitudinal structural ribs 517 spaced apart on the interior cavity 515.

Feed arrays 530-533 are positioned above reflector 511 (at least one additional feed array hidden from view), such as at or in reflector interior cavity 515 or an aperture in reflector 511 formed by reflector interior cavity 515. Feed arrays 530-533 are coupled to zenith base 534 and zenith pillar 535 which extends through reflector interior cavity 515 and gap 516. Cabling or other conduits for feed arrays 530-533 can be fed through zenith base 534 and zenith pillar 535. The additional zenith feed arrays 531-533 can increase the elevation coverage and provide more efficient, more effective, or redundant azimuthal coverage for antenna assembly 510 in selected azimuths.

In some examples, feed array 513 is employed for receipt (Rx) of RF signals and feed arrays 530-533 are employed of transmission (Tx) of RF signals. However, other examples include where both feed arrays are employed for both Tx/Rx operations. Incoming RF energy incident onto reflector surface 513 interacts with reflector surface 512 establishes ring-focused reflected RF energy which impinges onto feed array 513. Feed array 513 can convert the received radiative RF energy into conducted signals provided to various receiver circuitry elements. Advantageously, the combination of feed array 513 and feed arrays 530-533 provides for wide coverage over various elevations and a 360-degree azimuth. Specifically, feed array 513 can comprise a WAEFR ESA feed for 0°-45° elevation swath (with <2 dB scan loss) and 0°-360° azimuth coverage, while feed arrays 530-533 can comprise a zenith ESA feed for greater than 45°-90° elevation swath and 0°-360° azimuth coverage.

Figure 6:
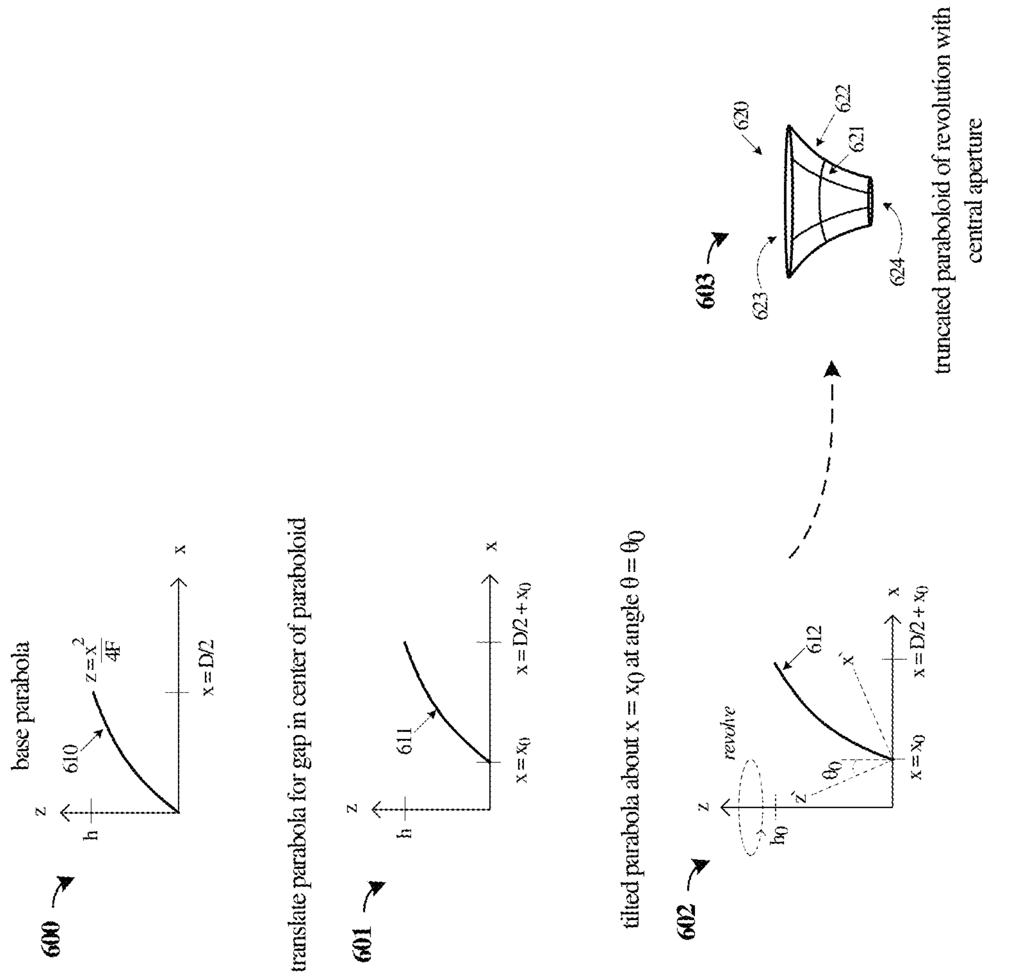
FIG. 6 illustrates example parabolic curves used to define paraboloid surfaces of revolution in an implementation.

FIG. 6 illustrates example paraboloids of revolution in views 600-603. In this example, paraboloid of revolution 620 with central aperture 624 is shown, although other examples may omit the central aperture. To illustrate how to form these paraboloids of revolution, graphs are included in views 600-602. It should be noted that a parabolic profile is just one example of an equation-based shape or cross-section for a reflector surface. The profile of the reflector surfaces discussed herein can be any suitable shape or cross-section selected to achieve a target gain or other target parameters for desired applications, and these profiles might be defined by a corresponding equation or rotation operation.

In view 600, a base parabolic segment is shown in plot 610 within axes z and x, defined parametrically by $z=x^2/4F$, and having a height 'h' and width 'D/2'. The designation 'F' in plot 610 refers to the focal length of the unshifted parabola, and 'D' refers to the diameter of the reflector surface. Thus, plot 610 defines half of the diameter of a parabolic surface. Turning now to view 601, a translation operation is performed on plot 610 to establish plot 611 having an offset along the x-axis of $x_0$. This translation is used to establish a central aperture 624 within paraboloid of revolution 620. From here, view 602 shows plot 612 comprising a tilted parabolic segment. Plot 612 is tilted by angle of $\theta_0$, to establish a final height of the paraboloid of $h_0$. This configuration can be referred to as an "upper branch" or "top branch" parabola, due in part to the parabola segment being above the x-axis before revolution about the z-axis. Plot 612 can be revolved about the z-axis (z=0) to establish paraboloid of revolution 620 having height $h_0$ and diameter $D+x_0$. Paraboloid of revolution 620 forms an open conical shape having convex side 622 and concave side 623, and also includes central aperture 624. Paraboloid of revolution 620 has concave parabolic nappe 622 on convex side 622 which forms reflector surface 621. A lens element can be positioned between the reflector surface and a feed array offset from the convex side.

Although the examples herein generally refer to RF receive (Rx) configurations of antenna systems, similar concepts can apply to transmit (Tx) configurations. Example frequency ranges for RF components, configurations, systems, and arrangements herein include various RF bands, such as microwave frequencies capable of transiting RF waveguide structures. Different frequency bands can be supported by similar architectures as shown herein, with associated geometry scaling to suit the selected frequency ranges, as well as selecting feed arrays tuned to the appropriate bands. While the examples herein cover portions of the RF bands noted above, other examples might include the Ka band or Ku band or other portions of the K bands (approximately 26.5 to 40 GHz), or X band (approximately 7 to 12 GHz). Other examples might be configured to support a frequency range corresponding to the IEEE bands of S band, L band, C band, X band, Ku band, K band, Ka band, V band, W band, among others, including combinations thereof. Other example RF frequency ranges and service types include ultra-high frequency (UHF), super high frequency (SHF), extremely high frequency (EHF), or other parameters defined by different organizations. In addition, various frequency bands associated with communication technology, such as Wi-Fi and 4G/5G cellular communications can be employed. These include the IEEE 802.11 family of frequency bands (Wi-Fi), and the 4G/5G broadband cellular network frequency bands including the low band (600 to 700 MHz), mid band (1.7 GHz to 2.5 GHz), high band (24 to 100 GHz (mmWave)) defined by the 3rd Generation Partnership Project (3GPP) and other organizations.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The various materials and manufacturing processes discussed herein are employed according to the descriptions above. However, it should be understood that the disclosures and enhancements herein are not limited to these materials and manufacturing processes, and can be applicable across a range of suitable materials and manufacturing processes. Thus, the descriptions and figures included herein depict specific implementations to teach those skilled in the art how to make and use the best options. For the purpose of teaching inventive principles, some conventional aspects have been simplified or omitted. Those skilled in the art will appreciate variations from these implementations that fall within the scope of this disclosure. Those skilled in the art will also appreciate that the features described above can be combined in various ways to form multiple implementations.

What is claimed is:

1. An apparatus, comprising:

a reflector for radio frequency energy having a reflector surface comprising a paraboloid of revolution that establishes an inverted truncated conical shape with a concave nappe; and the reflector surface configured to interact with the radio frequency energy to direct at least a portion of the radio frequency energy towards a feed array mounted about a perimeter of the inverted truncated conical shape.

2. The apparatus of claim 1, wherein the reflector surface establishes a divergent configuration for incident radio frequency energy.

3. The apparatus of claim 1, wherein the inverted truncated conical shape comprises a convex side having the concave nappe and a concave side comprising an interior cavity.

4. The apparatus of claim 3, comprising:

a zenith facing array positioned at an aperture of the interior cavity of the concave side.

5. The apparatus of claim 4, wherein the feed array is configured to receive the radio frequency energy, and wherein the zenith facing array is configured to transmit additional radio frequency energy.

6. The apparatus of claim 1, comprising:

the feed array mounted to a structure supporting the reflector at a base of the inverted truncated conical shape, wherein the structure is configured to axially align the reflector with respect to the feed array.

7. The apparatus of claim 1, comprising:

a lens element positioned a selected distance from the feed array and configured to alter a distribution of at least the portion of the radio frequency energy reflected by the reflector surface over a detection area of the feed array.

8. The apparatus of claim 7, wherein the lens element comprises a ring configuration mounted about the perimeter of the reflector and is positioned between the reflector surface and the feed array.

9. The apparatus of claim 7, wherein the lens element alters the distribution of at least the portion of the radio frequency energy by converging the portion of the radio frequency energy over the detection area of the feed array.

10. The apparatus of claim 7, wherein the lens element alters the distribution of at least the portion of the radio frequency energy by spreading the portion of the radio frequency energy across the detection area of the feed array.

11. The apparatus of claim 7, wherein the lens element comprises at least one among a uniform refractive index material having a biconvex shape and a graded index material and having a generally uniform thickness.

12. An antenna system, comprising:

a reflector for radio frequency energy having a reflector surface comprising a paraboloid of revolution that establishes an inverted truncated conical shape with a concave nappe, wherein the inverted truncated conical shape comprises a convex side having the concave parabolic nappe and a concave side comprising an interior cavity;

a first feed array mounted about a perimeter the inverted truncated conical shape;

a second feed array positioned in or above the interior cavity on the concave side; and a structure configured to mount to a base of the reflector and hold at least the first feed array.

13. The antenna system of claim 12, comprising:

a refraction element positioned a selected distance from the first feed array and configured to alter a distribution of at least the portion of the radio frequency energy reflected by the reflector surface over a detection area of the first feed array.

14. The antenna system of claim 13, wherein the refraction element comprises a ring configuration mounted about the perimeter of the reflector and is positioned between the reflector surface and the first feed array.

15. The antenna system of claim 13, wherein the refraction element alters the distribution of at least the portion of the radio frequency energy by converging the portion of the radio frequency energy over the detection area of the first feed array.

16. The antenna system of claim 13, wherein the refraction element alters the distribution of at least the portion of the radio frequency energy by spreading the portion of the radio frequency energy across the detection area of the first feed array.

17. The antenna system of claim 13, wherein the refraction element comprises at least one among a uniform refractive index material having a biconvex shape and a graded index material and having a generally uniform thickness.

18. A method, comprising:

forming a reflector for radio frequency energy having a reflector surface comprising a paraboloid of revolution that establishes an inverted truncated conical shape with a concave nappe.

19. The method of claim 18, comprising:

forming a lens element having a refractive property for the radio frequency energy;

positioning the lens element such that at least a portion of incident radio frequency energy reflected by the reflector surface has an altered distribution over a detection area of a feed array positioned a selected distance from the lens element.

20. The method of claim 18, wherein the lens element comprises at least one among a uniform refractive index material having a biconvex shape and a graded index material and having a generally uniform thickness.

* * * * *